United States Patent
Birru

(10) Patent No.: US 8,233,415 B2
(45) Date of Patent: Jul. 31, 2012

(54) PREAMBLE STRUCTURE FOR ENABLING MULTI-MODE WIRELESS COMMUNICATIONS

(75) Inventor: Dagnachew Birru, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 878 days.

(21) Appl. No.: 12/132,868

(22) Filed: Jun. 4, 2008

(65) Prior Publication Data

US 2009/0303907 A1    Dec. 10, 2009

(51) Int. Cl.
*H04B 7/00* (2006.01)

(52) U.S. Cl. ........ 370/310; 370/329; 370/345; 370/349; 375/150

(58) Field of Classification Search .................. 370/310, 370/329, 445, 349, 513; 375/219, 262, 260, 375/267, 150
See application file for complete search history.

(56) References Cited

U.S. PATENT DOCUMENTS

| | | | | |
|---|---|---|---|---|
| 6,363,107 | B1* | 3/2002 | Scott | 375/150 |
| 7,539,263 | B2* | 5/2009 | Jung et al. | 375/267 |
| 2002/0114355 | A1* | 8/2002 | Kim et al. | 370/503 |
| 2004/0170157 | A1* | 9/2004 | Kim et al. | 370/349 |
| 2005/0090202 | A1* | 4/2005 | Kim et al. | 455/67.11 |
| 2005/0232186 | A1* | 10/2005 | Karaoguz et al. | 370/328 |
| 2007/0189404 | A1* | 8/2007 | Baum et al. | 375/260 |
| 2007/0253467 | A1* | 11/2007 | Yang | 375/141 |
| 2007/0291696 | A1* | 12/2007 | Zhang et al. | 370/331 |
| 2008/0037616 | A1* | 2/2008 | Kim et al. | 375/150 |
| 2008/0107203 | A1* | 5/2008 | Wang et al. | 375/295 |

\* cited by examiner

*Primary Examiner* — Ricky Ngo
*Assistant Examiner* — Rasheed Gidado
(74) *Attorney, Agent, or Firm* — Larry Liberchuk

(57) ABSTRACT

A method for generating preamble structures to be used in multi-mode wireless communication systems. The method includes generating a basic element sequence in a predefined length, wherein the basic element sequence has a circularly orthogonal property; generating a type-A preamble by repeating the basic element sequence a number of predefined times; and generating a type-B preamble by adding respective values of real parts to values of imaginary parts of elements in the type-A preamble. The type-A preamble and type-B preamble are cross-correlated.

14 Claims, 4 Drawing Sheets

PREAMBLE STRUCTURE FOR ENABLING MULTI-MODE WIRELESS COMMUNICATIONS

The present invention generally relates to preamble structures for multi-mode wireless communication systems.

In a packet based or block based wireless transmission system, each packet starts with a repeated time-domain sequence, usually referred to as a training sequence. For example, in an orthogonal frequency division multiplexing (OFDM) communication or a single-carrier block transmission communication with a guard interval the training sequence is transmitted as a preamble.

In typical wireless systems, service parameter estimation and tracking are based on the utilization of training sequences. To this end, a training sequence is used by a receiver for automatic gain control (AGC), clock synchronization, initial frequency offset correction, phase adjustment, as well as for channel parameters estimation. The training sequence may be formed using two or more sequences, each of which is used for different purposes. For example, as defined in the IEEE802.11x standards, a preamble pilot of an OFDM symbol contains two training sequences: a short sequence and a long sequence.

Regardless of the structure of the transmitted training sequence (or preamble), the transmitted sequence can be detected only by a designated receiver. A receiver typically performs correlation and synchronization functions using the received training sequence and the locally stored known sequences. Consequently, the use of the training sequence is limited to a transmitter-receiver set.

This is a limiting factor as new wireless communication systems are increasingly requiring modular or multi-mode communication where, for example, a single transmitter can communicate with multiple receivers. To facilitate this demand, a transmitter capable of generating and transmitting a training sequence that can be detected by multiple different types of receivers is required. This further requires a receiver that can detect training sequences of different types of transmitters, i.e., transmitters that are not associated with the receiver. In the related art there is not a known approach that can overcome this limitation.

It would be therefore advantageous to provide a solution that enables different types of receivers to detect training sequences of other unassociated transmitters.

One embodiment of the invention is a multi-mode wireless communication system. The system comprises a first transmitter capable of generating a type-A preamble; a second transmitter capable of generating a type-B preamble, wherein the type-A preamble and the type-B preamble are cross-correlated; a first receiver capable of detecting the type-A preamble and further detecting the type-B preamble using the type-A preamble; and a second receiver capable of detecting the type-B preamble and further detecting the type-A preamble using the type-B preamble.

Another embodiment of the invention is a method for generating preamble structures to be used in multi-mode wireless communication systems. The method includes generating a basic element sequence in a predefined length, wherein the basic element sequence has a circularly orthogonal property; generating a type-A preamble by repeating the basic element sequence a number of predefined times; and generating a type-B preamble by adding respective values of real parts to values of imaginary parts of elements in the type-A preamble, wherein the type-A preamble and type-B preamble are cross-correlated.

Still another embodiment of the invention is a computer-readable medium having stored thereon computer executable code operable to enable a computer to execute the process of generating preamble structures to be used in multi-mode wireless communication systems. The computer executable code causes a computer to execute the process of: generating a basic element sequence in a predefined length, wherein the basic element sequence has a circularly orthogonal property; generating a type-A preamble by repeating the basic element sequence a number of predefined times; and generating a type-B preamble by adding respective values of real parts to values of imaginary parts of elements in the type-A preamble, wherein the type-A preamble and type-B preamble are cross-correlated.

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

Figure 1:
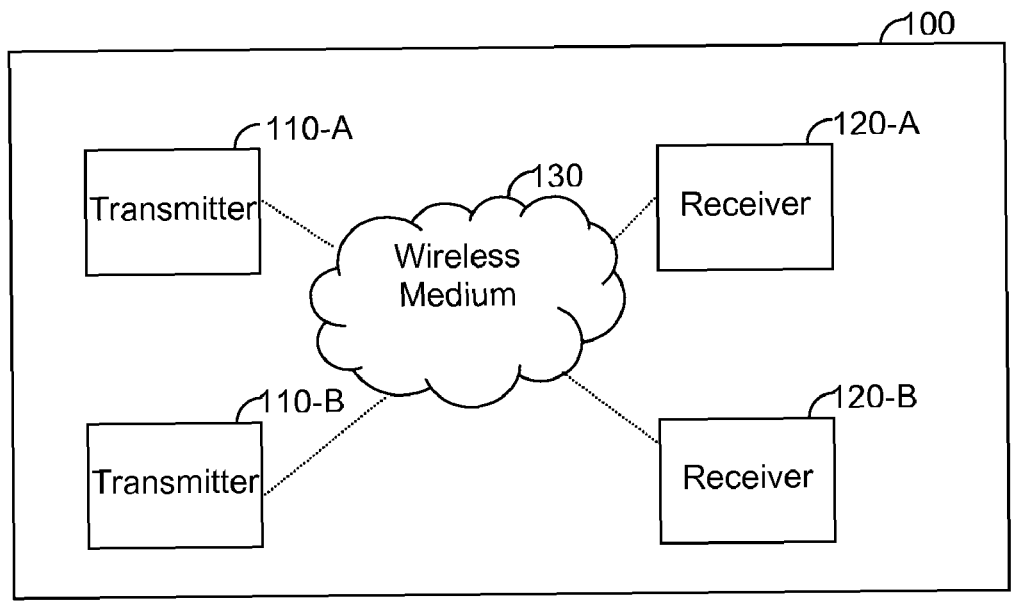
FIG. 1 is an illustration of a multi-mode wireless communication system according to one embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is an illustration of a multi-mode wireless communication system 100 according to one embodiment of the invention. The system 100 includes a transmitter 110-A and a transmitter 110-B that communicates with a receiver 120-A and a receiver 120-B over a wireless medium 130. In a preferred embodiment data is transferred between the transmitters 110 and receivers 120 over an unlicensed frequency band of 60 GHz. The receivers 120 and transmitters 210 implement a wireless modem that enables data block transmission, such as an OFDM modem, a single-carrier modem, a multi-carrier modem, and the like.

The transmitter 110-A and receiver 120-A set may be of a different type and having different properties than the transmitter 110-B and receiver 120-B set. For example, the transmitter 110-B and receiver 120-B set may be a low cost device that is less robust to channel interferences, where the transmitter 110-A and receiver 120-A set may be a robust device. A transmitter 110-A sends a type-A preamble that can be detected by the receiver 120-A and the transmitter 110-B transmits a type-B preamble that can be detected by the receiver 120-B. In accordance with an embodiment of the invention the receiver 120-A also detects the type-B preamble, and likewise the receiver 120-B can interpret the type-A preamble. As will be described in greater detail below, this is achieved using a flexible preamble structure constructed in accordance the principles of the invention.

In order to allow the detection of multi-type preambles by a single receiver, a transmitter sends a preamble with a sequence that can be cross-correlated with preambles generated by other transmitters. For example, the type-A preamble has good cross-correlation properties with the type-B preamble. The ability to detect different types of preambles (i.e., training sequences) by receivers enables to design and facilitate multi-mode wireless communication systems. This feature is advantageous in systems operating in 60 GHz or similar frequency bands.

In a preferred embodiment the training sequence of the type-A preamble is constructed using repetitions of a constant amplitude zero autocorrelation (CAZAC) sequence.

The CAZAC sequence has a circularly orthogonal property and may be defined as follows:

$$A(n = p + N*q) = e^{j\left(\frac{2\pi}{N}pq\right)}, \quad (1)$$
$$p = 1, \ldots, N$$
$$q = 1, \ldots, N$$

The parameter N is an integer number that determines the length of the sequence. For a given value of N the sequence length is $N^2$. For example, the length of the sequence provided in equation (1) may be 4 (N=2), 9 (N=3), 16 (N=4), and so on. These types of sequences are also known as the Frank-Zadoff sequences. Therefore, a good selection of a value of the parameter N may result in sequences that exhibit properties, such as cyclically orthogonal and a low peak-to-average power ratio (PAPR). These properties are preferred for operation of wireless communication systems in high frequency bands (e.g., 60 GHz).

Figure 2A:
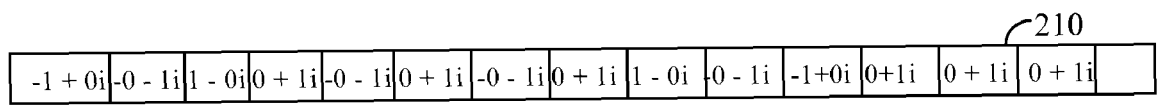
FIGS. 2A and 2B are illustrations of exemplary preamble structures as taught by an embodiment of the invention.

The repetitions of the basic element sequence A(n) can be achieved using a cover sequence C(n). In a preferred embodiment, the type-A preamble is defined as a Kronecker tensor product of the basic element sequence A(n) and a cover sequence C(n). That is, the type A preamble $y_A$ may be defined as follows:

$$y_A = A \otimes C \quad (2)$$

where $\otimes$ is a Kronecker tensor product operator. One of ordinary skill in the art would be familiar with the mathematical function of the Kronecker tensor. A non-limiting example for a structure of a type-A preamble 210 of a preferred embodiment is shown in FIG. 2A. The type-A preamble 210 is structured using a sequence of complex numbers.

In accordance with an embodiment of the invention, a sequence $y_B$ of the type-B preamble is structured using a value of the real part and a value of the imaginary part in the type-A preamble $y_A$. Specifically, the sequence $y_B$ may be defined as follows:

$$y_B(n) = \text{real}(y_A(n)) + \text{imag}(y_A(n)) \quad (3)$$

Figure 2B:
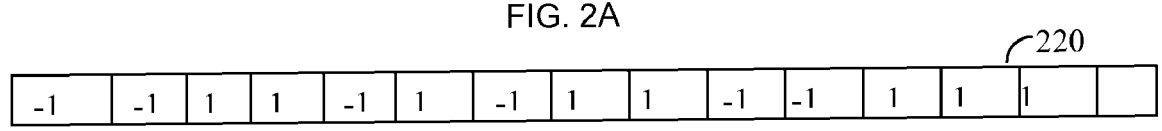

A non-limiting example for a structure of a type-B preamble 220 of a preferred embodiment is shown in FIG. 2B. The type-B preamble 220 is structured using a sequence of non-complex numbers, where each number is a summation of the values of the respective complex numbers in the preamble 210. For example, the first element of the preamble 210 is −1+0i. Therefore, the value of the first element on the preamble 220 is: −1, i.e., real(−1)+imag (0i)=−1.

For certain values of N, $y_B(n)$ and $y_A(n)$ are cross-correlated, i.e., a type-A device can detect a type-B preamble by only correlating with a type-A preamble. In a preferred embodiment, when the value of the length parameter N equals 4, $y_B(n)$ and $y_A(n)$ exhibit good cross-correlation properties.

Figure 3A:
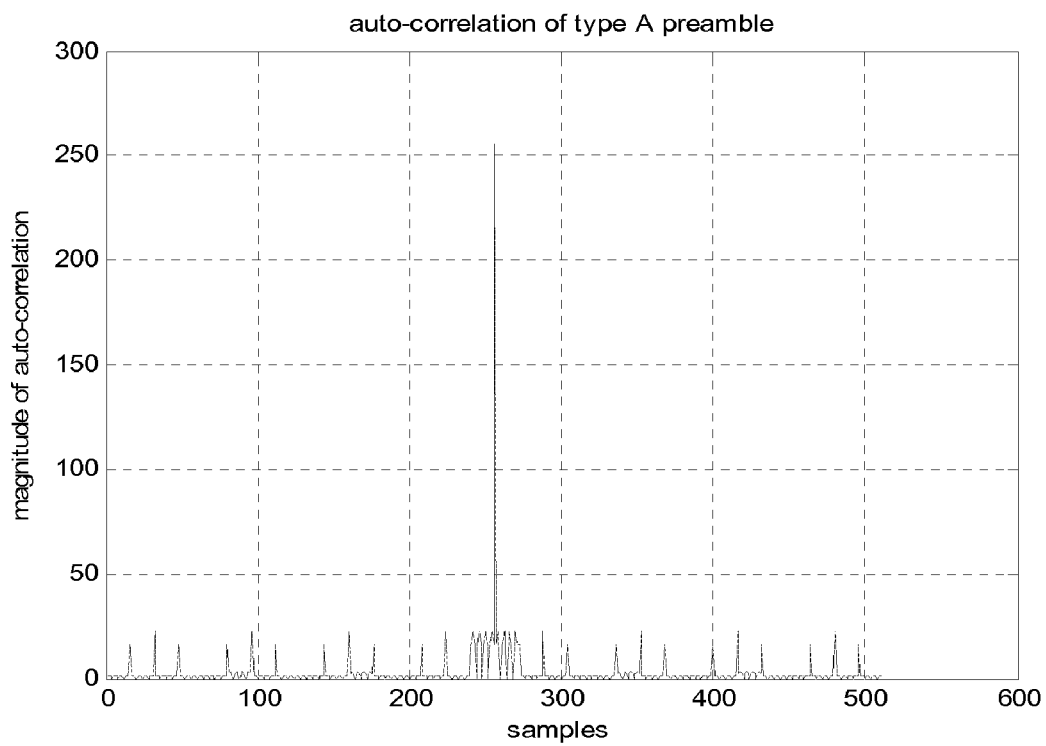
FIGS. 3A, 3B and 3C illustrate correlation simulation results to preambles generated according to an embodiment of the invention.
Figure 3B:
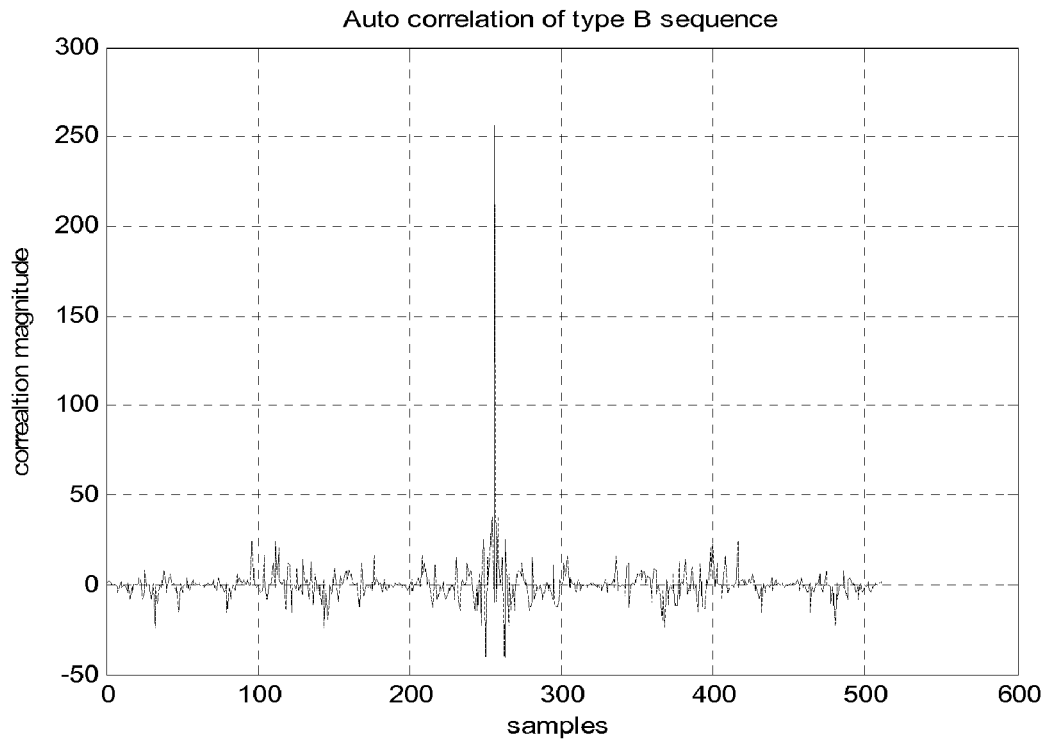
Figure 3C:
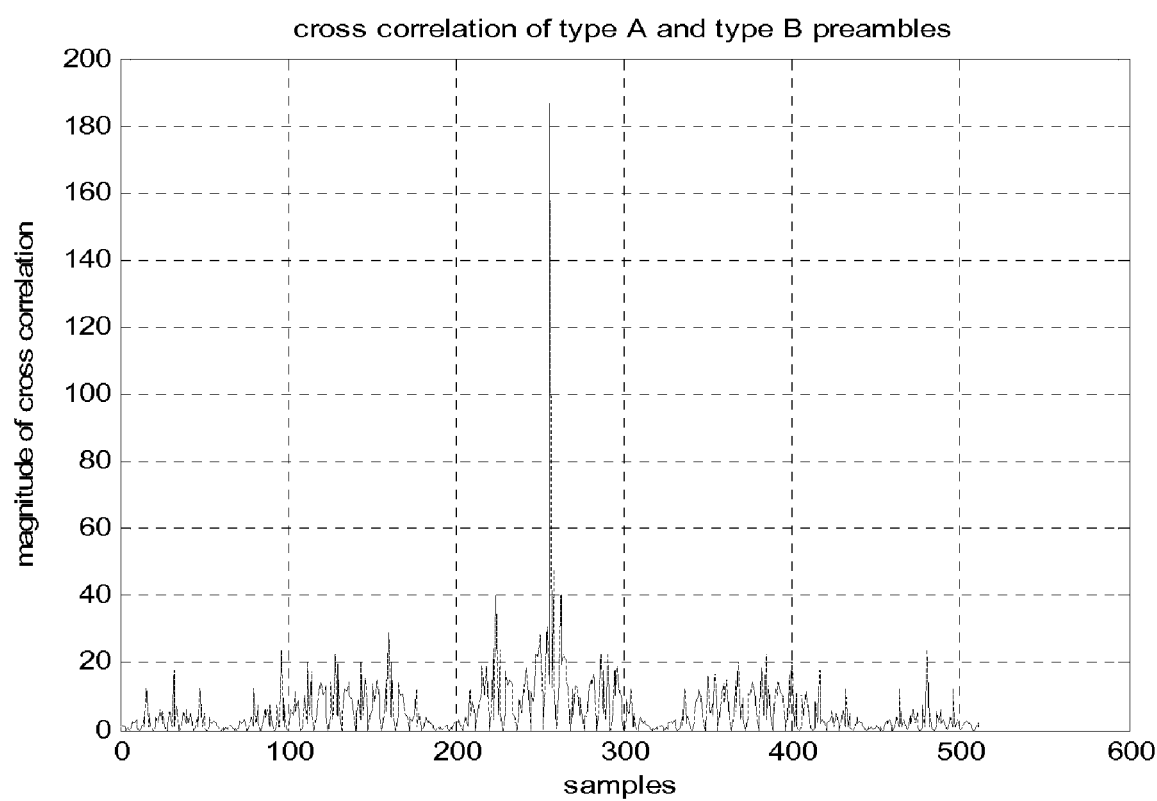

This is further demonstrated in FIGS. 3A, 3B, and 3C that show simulation results where the value of the length parameter N is four (4); thus, the length of the basic sequence A is 16 (i.e., $4^2$). Also, the number of repetitions C equals the length of the basic sequence 16, therefore the length of each of the preambles A and B is 256 (i.e., $16^2$).

FIGS. 3A and 3B illustrate the autocorrelation, i.e., the cross-correlation of a signal with itself of type A and type B preambles, respectively. FIG. 3C shows the cross-correlation of type A and type B preambles, i.e., the measure of similarity between the two signals. As shown in FIG. 3C, the significant cross-correlation peak allows type A and B devices to detect each others preambles using their own preambles.

Figure 4:
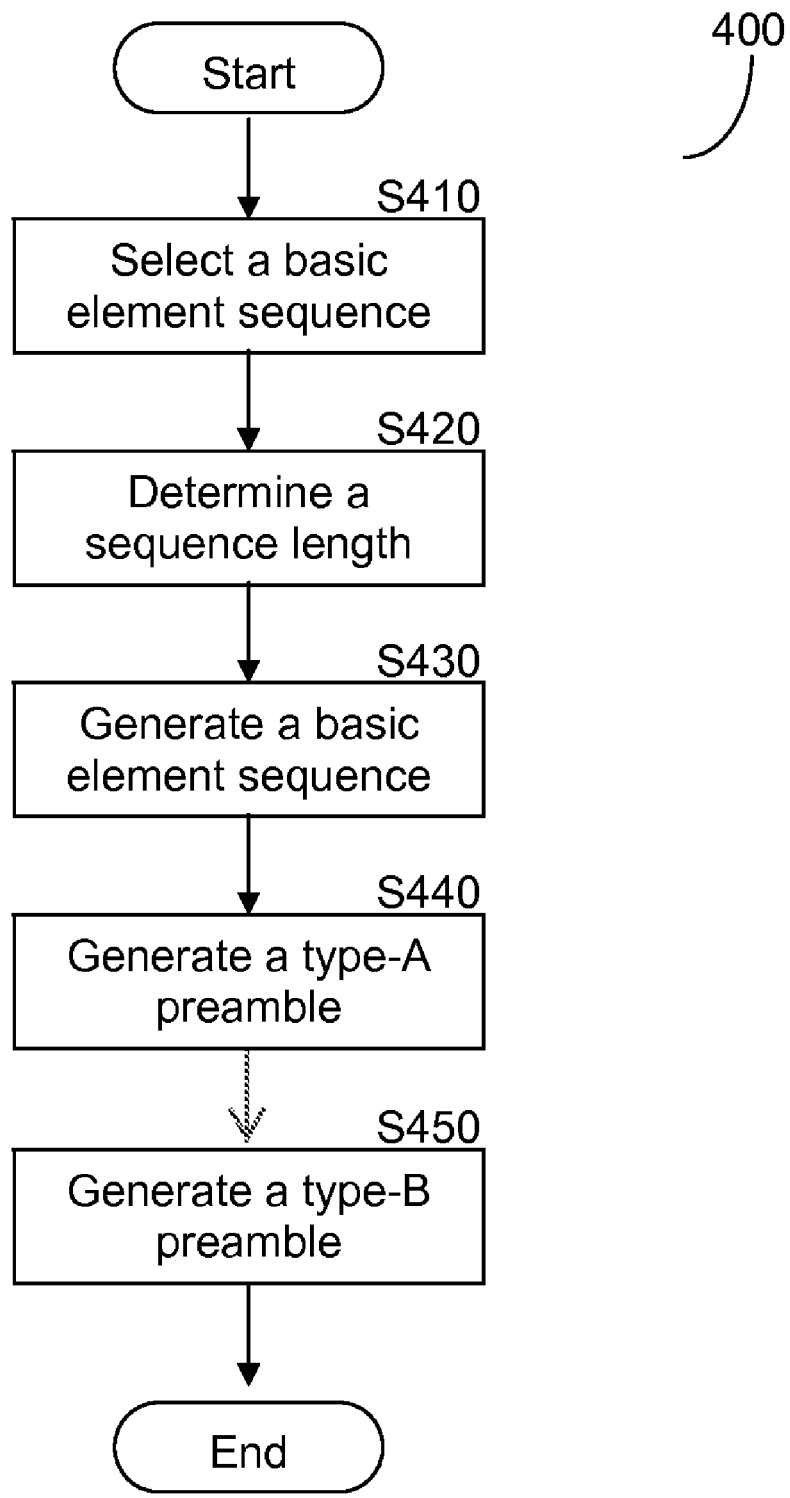
FIG. 4 is a flowchart describing the method for generating flexible preamble structures to be used in a multi-mode communication system as taught by an embodiment the invention.

FIG. 4 shows a non-limiting and exemplary flowchart 400 describing a method for generating flexible preamble structures that can be used in a multi-mode wireless communication system. The method generates two types of preambles: type-A and type-B, each of which includes a different training sequence. At S410 a basic element sequence that has a circularly orthogonal property is selected. In accordance with a preferred embodiment, the basic element sequence is a CAZAC sequence as defined, for example, in equation 1 above. At S420, the length of the basic element sequence is determined by selecting a proper value of a length parameter N. A proper value of N would result with type-A and type-B preambles into cross-correlation. In a preferred embodiment, N equals four (4). At S430, the basic element sequence having a length according to the value of the length parameter N is generated. At S440, the type-A preamble is generated by repeating the basic element sequence a number of predefined times. In a preferred embodiment the repetitions is a product of a Kronecker tensor of the basic element sequence and the cover sequence. The resulting sequence of the type-A preamble is a complex number. At S450, a sequence of the type-B preamble is generated by adding the value of the real part to the value of the imaginary part of each element in the type-A preamble sequence. The sequence of the type-B preamble is a non-complex number.

It should be noted that one of ordinary skill in the art could adapt the principles disclosed herein to design a multi-mode wireless communication system that includes more than two device sets (transmitter-receiver set). In such system, each transmitter generates its own preamble that can be detected by all receivers using the respective preamble of the receiver.

The foregoing detailed description has set forth a few of the many forms that the present invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What I claim is:

1. A multi-mode wireless communication system, comprising:
   a first transmitter for generating a type-A preamble;
   a second transmitter for generating a type-B preamble, wherein the type-A preamble and the type-B preamble are cross-correlated;
   a first receiver for detecting the type-A preamble and further detecting the type-B preamble using the type-A preamble; and
   a second receiver for detecting the type-B preamble and further detecting the type-A preamble using the type-B preamble, wherein the type-B preamble is constructed by adding respective values of real parts to respective values of imaginary parts of elements in the type-A preamble.

2. The system of claim 1, wherein the first transmitter and second transmitter communicate with the first receiver and the second receiver over a wireless medium that enables data transfer over at least an unlicensed frequency band of 60 GHz.

3. The system of claim 1, wherein the type-A preamble includes repetitions of a basic element sequence, the basic element sequence being at least a constant amplitude zero autocorrelation (CAZAC) sequence.

4. The system of claim 3, wherein the number of repetitions are determined using a cover sequence.

5. The system of claim 4, wherein the type-A preamble is the product of a Kronecker tensor operation applied on the basic element sequence and the cover sequence.

6. The system of claim 3, wherein the length of the basic element sequence is predefined.

7. The system of claim 3, wherein the type-A preamble includes a sequence of complex numbers.

8. The system of claim 1, wherein the type-B preamble includes a sequence of non-complex numbers.

9. A method for generating preamble structures to be used in a multi-mode wireless communication system, comprising:
   generating a basic element sequence in a predefined length, wherein the basic element sequence has a circularly orthogonal property;
   generating a type-A preamble by repeating the basic element sequence a number of predefined times; and
   generating a type-B preamble by adding respective values of real parts to values of imaginary parts of elements in the type-A preamble, wherein the type-A preamble and type-B preamble are cross-correlated.

10. The method of claim 9, wherein generating the type-A preamble includes applying a Kronecker tensor operation on the basic element sequence and a cover sequence.

11. The method of claim 10, wherein the basic element sequence is a constant amplitude zero autocorrelation (CAZAC) sequence.

12. The method of claim 9, wherein the type-A preamble includes a sequence of complex numbers.

13. The method of claim 9, wherein the type-B preamble includes a sequence of non-complex numbers.

14. A non-transitory computer-readable medium having stored thereon a computer executable code for generating preamble structures to be used in a multi-mode wireless communication system, the computer executable code comprising:
   generating a basic element sequence in a predefined length, wherein the basic element sequence has a circularly orthogonal property;
   generating a type-A preamble by repeating the basic element sequence a number of predefined times; and
   generating a type-B preamble by adding respective values of real parts to values of imaginary parts of elements in the type-A preamble, wherein the type-A preamble and type-B preamble are cross-correlated.

* * * * *